United States Patent
Idem et al.

(10) Patent No.: US 8,105,420 B2
(45) Date of Patent: Jan. 31, 2012

(54) METHOD FOR INHIBITING AMINE DEGRADATION DURING $CO_2$ CAPTURE FROM A GAS STREAM

(75) Inventors: Raphael Idem, Regina (CA); Paitoon Tontiwachwuthikul, Regina (CA); Chintana Saiwan, Vudtakad 16 (TH); Teeradet Supap, Regina (CA); Purachet Pitipuech, Regina (CA)

(73) Assignee: The University of Regina, Regina, Saskatchewan (CA)

( * ) Notice: Subject to any disclaimer, the term of this patent is extended or adjusted under 35 U.S.C. 154(b) by 146 days.

(21) Appl. No.: 12/273,776

(22) Filed: Nov. 19, 2008

(65) Prior Publication Data

US 2009/0205496 A1    Aug. 20, 2009

Related U.S. Application Data

(60) Provisional application No. 60/989,269, filed on Nov. 20, 2007.

(51) Int. Cl.
*B01D 47/00* (2006.01)
(52) U.S. Cl. ...... 95/236; 423/228; 423/229; 252/182.29
(58) Field of Classification Search ............ 95/149–240; 252/182.11, 182.12, 182.17, 182.23, 182.29; 423/220–234, 242.1–244; 96/234–371
See application file for complete search history.

(56) References Cited

U.S. PATENT DOCUMENTS

| | | | | |
|---|---|---|---|---|
| 3,896,044 | A * | 7/1975 | Mago et al. | 252/192 |
| 3,959,170 | A * | 5/1976 | Mago et al. | 252/189 |
| 4,405,584 | A * | 9/1983 | Foroulis | 423/228 |
| 4,575,455 | A * | 3/1986 | Miller | 423/228 |
| 5,648,054 | A * | 7/1997 | DeBerry | 423/226 |
| 7,214,358 | B2 * | 5/2007 | Ravary et al. | 423/242.1 |
| 7,384,616 | B2 * | 6/2008 | Hakka | 423/210 |
| 7,754,102 | B2 * | 7/2010 | Zhang et al. | 252/184 |
| 2004/0253159 | A1* | 12/2004 | Hakka et al. | 423/228 |
| 2005/0132883 | A1* | 6/2005 | Su et al. | 95/235 |
| 2006/0286017 | A1* | 12/2006 | Hakka | 423/220 |
| 2009/0101868 | A1* | 4/2009 | Zhang et al. | 252/184 |

* cited by examiner

*Primary Examiner* — Duane Smith
*Assistant Examiner* — Thomas McKenzie
(74) *Attorney, Agent, or Firm* — Rothwell, Figg, Ernst & Manbeck, P.C.

(57) ABSTRACT

The present application includes a method for inhibiting amine degradation during $CO_2$ capture from flue gas streams. Particularly, the present disclosure relates to a method of inhibiting $O_2$- and/or $SO_2$-induced degradation of amines using sodium sulfite ($Na_2SO_3$), potassium sodium tartrate tetrahydrate ($KNaC_4H_4O_6 \cdot 4H_2O$), ethylenediaminetetraacetic acid (EDTA) or hydroxylamine ($NH_2OH$), or analogs or mixtures thereof during $CO_2$ capture by amines.

27 Claims, 9 Drawing Sheets

US 8,105,420 B2

METHOD FOR INHIBITING AMINE DEGRADATION DURING CO$_2$ CAPTURE FROM A GAS STREAM

FIELD OF THE DISCLOSURE

The present application relates to a method for inhibiting amine degradation during carbon dioxide (CO$_2$) capture from a gas stream. Particularly, the present disclosure relates to a method of inhibiting oxygen- (O$_2$) and/or sulfur dioxide- (SO$_2$) induced degradation of amines using sodium sulfite (Na$_2$SO$_3$), potassium sodium tartrate tetrahydrate (KNaC$_4$H$_4$O$_6$.4H$_2$O), ethylenediaminetetraacetic acid (EDTA) or hydroxylamine (NH$_2$OH), or analogs thereof or mixtures thereof.

BACKGROUND

The composition of fossil fuel-derived flue gases is commonly made up of carbon dioxide (CO$_2$), nitrogen (N$_2$), oxygen (O$_2$), sulfur dioxide (SO$_2$), nitrogen dioxide (NO$_2$), and fly ash of inorganic oxides such as SiO$_2$, Al$_2$O$_3$, Fe$_2$O$_3$, CaO, MgO, Na$_2$O, K$_2$O and P$_2$O$_5$.[1] In order to comply with environmental regulations, the flue gas streams must be treated prior to atmospheric discharge to remove CO$_2$ known as a major greenhouse gas. Absorption via chemical reactions using aqueous amine solutions has been found to be a very effective technique in separating CO$_2$ from these low pressure flue gas streams in order to reduce CO$_2$ to the required concentration target. However, reactive contaminants, specifically O$_2$ and SO$_2$, constantly introduce a serious amine degradation problem during the absorption process. Initially, inside the absorber, O$_2$ and SO$_2$ make first contact with the amine solution during the CO$_2$ absorption process causing amine breakdown. The structural deterioration is then aggravated in the regenerator where a combination of high temperature and highly soluble SO$_2$ carried over with the liquid stream promotes additional amine degradation. The degradation severely affects the absorption plant by reducing the CO$_2$ absorption capacity of the amine and inducing corrosion and foaming problems due to accumulation of the degradation products.

The literature has suggested a long-term solution for amine degradation by locating the source of O$_2$.[2] However, this approach is highly complicated since a complete removal of O$_2$ as well as SO$_2$ from a major source such as flue gas streams is impractical. Also, the detection and removal of O$_2$ is especially known to be time-consuming and labor-intensive.[3] To maintain the performance of the CO$_2$ absorption process, a quick prevention technique must then be included as one of the operational routines of the absorption unit to immediately cope with the degradation problem. One of the preferred choices is the use of degradation inhibitors due to their simplicity and instant effect.

Consequent upon the test and confirmation of the severity of oxidative degradation of various alkanolamines, including monoethanolamine (MEA), diethanolamine (DEA) and methyldiethanolamine (MDEA), it was recommended by Rooney et al., and Rooney and Dupart to use O$_2$ scavengers such as sulfites, hydroxylamine, and hydrazine (that are typically used in boiler-feed water) to reduce O$_2$ to ppm levels in alkanolamine systems.[2,4] Useful guidelines for selection of appropriate inhibitors were later given in the literature.[5] According to Veldman, O$_2$ concentration in an alkanolamine unit was normally low, thus only allowing the reaction to proceed as a partial oxidation reaction to produce carboxylic acids rather than a full oxidation of the alkanolamine to CO$_2$ plus NO$_2$.[5] Their DEA degradation experiments showed that partial oxidation of DEA to carboxylic acids proceeded at temperatures of less than 323 K with dissolved O$_2$ of less than 1 ppm in the solution.

The use of a commercial corrosion inhibitor which also acted as O$_2$ scavenger was reported to control the level of bis(2-hydroxyethyl)glycine (bicine), an oxidative degradation product in a commercial MDEA-based gas treating unit.[6] To effectively control O$_2$ from degrading MDEA to bicine, scavenging O$_2$ in the liquid phase of alkanolamine solution was preferred as compared to the gas phase of flue gas streams. With this approach, the rate of bicine build-up in MDEA solution in an industrial plant was reduced from 60 ppm/day to 6 ppm/day. Unfortunately, the inhibitor/O$_2$ scavenger information was not disclosed in the literature.

Chi and Rochelle investigated various additives as potential degradation inhibitors in iron catalyzed MEA oxidative degradation system with and without CO$_2$.[7] The additives consisted of ethylenediaminetetraacetic acid (EDTA), bicine, glycine, and diethylethanolamine (DEMEA). Only EDTA and bicine were reported to be effective in reducing the degradation rate of MEA. EDTA was found to decrease the rate of oxidation of MEA when CO$_2$ was present. However, it had no effect when CO$_2$ was absent from the oxidation system. Bicine, a degradation product itself, was also found to be effective in reducing the MEA oxidative degradation rate.[6] It decreased the degradation in systems with and without CO$_2$. It must be noted that a contradictory result was reported by this study in terms of CO$_2$ loading effect in MEA degradation systems. An increase in the CO$_2$ loading was found to increase the degradation rate. This result was opposite to those reported in other works.[2,8,9,10,11]

Recently, degradation inhibitors for copper and iron catalyzed oxidative degradation of MEA have been evaluated.[12] Various compounds including undisclosed inorganic Inhibitor A, sodium sulfite (Na$_2$SO$_3$) and formaldehyde were investigated. The experiments were all carried out using conditions corresponding to the top and bottom of the absorber with 7 kmol/m$^3$ MEA, air containing 21% O$_2$, lean/rich CO$_2$ loading, and at 328 K. Inhibitor A was found to successfully reduce MEA oxidation rate in both copper and iron catalyzed systems. It was also effective in the systems with lean and rich CO$_2$ conditions. Inhibitor A was also found to inhibit the MEA degradation more easily in Cu catalyzed system and rich CO$_2$ loading than in Fe catalyzed and lean CO$_2$ loading environments. Na$_2$SO$_3$ also decreased MEA degradation rate in both copper and iron catalyzed systems. For copper-catalyzed MEA degradation, Na$_2$SO$_3$ decreased the degradation rate until its concentration reached 100 ppm. The degradation rate was found to increase if a higher concentration was used. Although, formaldehyde could reduce the degradation rate, it was not as effective as Inhibitor A. Both Na$_2$SO$_3$ and formaldehyde worked more effectively in copper catalyzed environment than iron system. As opposed to Na$_2$SO$_3$ and formaldehyde which were also found to deteriorate during MEA degradation, Inhibitor A did not decompose. Inhibitor A therefore, did not need to be further added or replaced later in the process.

SUMMARY OF THE DISCLOSURE

The present application includes a method for inhibiting oxygen- (O$_2$) and/or sulfur dioxide- (SO$_2$) induced amine degradation during carbon dioxide (CO$_2$) capture from a gas stream.

Accordingly, the present application includes a method for inhibiting O$_2$- and/or SO$_2$-induced amine degradation during $CO_2$ capture from a gas stream comprising adding to an amine absorbent, an effective amount of an inhibitor of $O_2$- and/or $SO_2$-induced amine degradation selected from sodium sulfite ($Na_2SO_3$), potassium sodium tartrate tetrahydrate ($KNaC_4H_4O_6 \cdot 4H_2O$), ethylenediaminetetraacetic acid (EDTA) and hydroxylamine ($NH_2OH$), and analogs and mixtures thereof.

The present disclosure also relates to a method for removing $CO_2$ from a gas stream comprising contacting the gas stream with a liquid absorbent comprising an amine and an effective amount of an inhibitor of $O_2$- and/or $SO_2$-induced amine degradation, wherein the inhibitor is selected from sodium sulfite ($Na_2SO_3$), potassium sodium tartrate tetrahydrate ($KNaC_4H_4O_6 \cdot 4H_2O$), ethylenediaminetetraacetic acid (EDTA) and hydroxylamine ($NH_2OH$), and analogs and mixtures thereof.

Also included within the present disclosure is the use of sodium sulfite ($Na_2SO_3$), potassium sodium tartrate tetrahydrate ($KNaC_4H_4O_6 \cdot 4H_2O$), ethylenediaminetetraacetic acid (EDTA) or hydroxylamine ($NH_2OH$), or analogs or mixtures thereof to, inhibit $O_2$- and/or $SO_2$-induced amine degradation during $CO_2$ capture from gas streams.

The present disclosure also relates to a composition for capturing $CO_2$ from gas streams comprising an amine and an inhibitor of $O_2$- and/or sulfur $SO_2$-induced amine degradation, wherein the inhibitor is selected from sodium sulfite ($Na_2SO_3$), potassium sodium tartrate tetrahydrate ($KNaC_4H_4O_6 \cdot 4H_2O$), ethylenediaminetetraacetic acid (EDTA) and hydroxylamine ($NH_2OH$), and analogs and mixtures thereof.

Other features and advantages of the present application will become apparent from the following detailed description. It should be understood, however, that the detailed description and the specific examples while indicating preferred embodiments of the application are given by way of illustration only, since various changes and modifications within the spirit and scope of the disclosure will become apparent to those skilled in the art from this detailed description.

BRIEF DESCRIPTION OF THE DRAWINGS

The disclosure will now be described in relation to the drawings in which.

DETAILED DESCRIPTION OF THE DISCLOSURE

Figure 1:
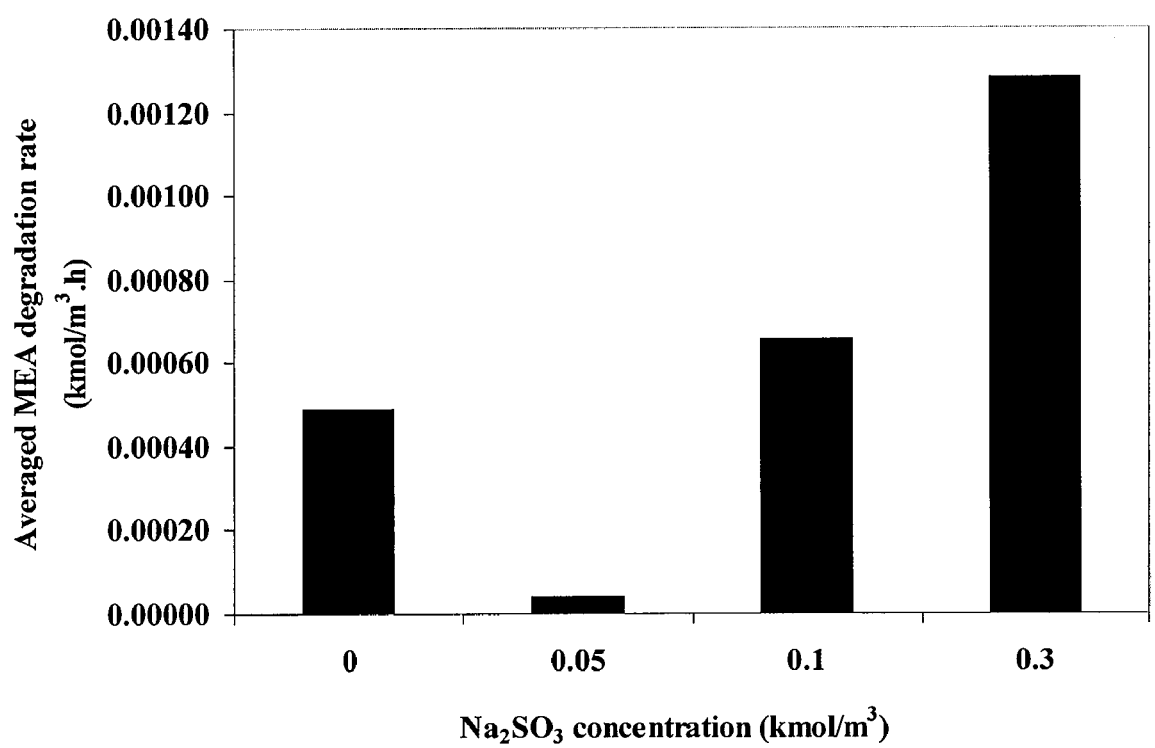
FIG. 1 shows the averaged monoethanolamine (MEA) degradation rate at various sodium sulfite ($Na_2SO_3$) concentrations in the presence of 6% $O_2$.

No prior report describes the development or testing of an inhibitor of $O_2$- and/or $SO_2$-induced degradation of amines. It has been shown herein that the $O_2$- and/or $SO_2$-induced degradation of amines is inhibited during $CO_2$ capture from a gas stream by adding certain inhibitors of this degradation process to the amine absorbent.

Accordingly, the present application includes a method for inhibiting $O_2$- and/or $SO_2$-induced amine degradation during $CO_2$ capture from a gas stream comprising adding to an amine absorbent, an effective amount of an inhibitor of $O_2$- and/or $SO_2$-induced amine degradation selected from sodium sulfite ($Na_2SO_3$), potassium sodium tartrate tetrahydrate ($KNaC_4H_4O_6 \cdot 4H_2O$), ethylenediaminetetraacetic acid (EDTA) and hydroxylamine ($NH_2OH$), and analogs and mixtures thereof.

The term "amine absorbent" as used herein refers to any liquid comprising an amine-containing compound which is used to absorb $CO_2$ from a gas stream. In an embodiment of the disclosure, the amine is any amine which captures carbon dioxide ($CO_2$) from a gas stream. In another embodiment, the amine is selected from monoethanolamine (MEA), diethanolamine (DEA), methyldiethanolamine (MDEA), MEA-MDEA mixtures and DEA-MDEA mixtures. In a suitable embodiment, the amine is monoethanolamine. During capture of carbon dioxide ($CO_2$) from a gas stream, it is an embodiment that the amine is present in an amount of about 2.5 kmol/m$^3$ to about 7.5 kmol/m$^3$. In a suitable embodiment, the amine is present in an amount of about 5.0 kmol/m$^3$. In a further embodiment, the amine absorbent also comprises carbon dioxide ($CO_2$). In another embodiment, the amine absorbent is pre-loaded with $CO_2$ in an amount from about 0.05 to about 2 mol $CO_2$/mol of amine, more suitably about 0.1 to 0.5 mol $CO_2$/mol of amine.

The term "effective amount" of an inhibitor compound as used herein is a quantity sufficient to, when included in an amine absorbent composition, effect beneficial or desired results, and, as such, an "effective amount" or synonym thereto depends upon the context in which it is being applied. For example, in the context of inhibiting $O_2$- and/or $SO_2$-induced amine degradation, it is an amount of the compound sufficient to achieve such an inhibition as compared to the response obtained without the compound. The amount of a given inhibitor compound of the present disclosure that will correspond to such an effective amount will vary depending upon various factors, including, for example, the composition of the absorbent, the identity of the amine, the composition of the gas, the temperature, and the like, but can nevertheless be routinely determined by one skilled in the art.

The term "analog" as used herein refers to any related analog of the claimed inhibitors, for example, compounds having similar electronic and structural characteristics. For example, alternative alkali metal salts (for example $Li^+$, $K^+$, $Na^+$, $Cs^+$ and $Rb^+$) may be used in place of the claimed salts. Several analogs of EDTA that have similar chelating properties are known in the art (including for example, ethylene glycol tetraacetic acid (EGTA) and 1,2-bis(o-aminophenoxy)ethane-N,N,N',N'-tetraacetic acid (BAPTA)).

In an embodiment, the inhibitor of amine degradation is sodium sulfite ($Na_2SO_3$). When $Na_2SO_3$ is used as the inhibitor, it is an embodiment that it is added to the amine absorbent in an amount of about 0.05 $kmol/m^3$ to about 0.3 $kmol/m^3$. In a further embodiment, the $Na_2SO_3$ is added in an amount of about 0.05 $kmol/m^3$.

In another embodiment, the inhibitor of amine degradation is potassium sodium tartrate tetrahydrate ($KNaC_4H_4O_6.4H_2O$). When $KNaC_4H_4O_6.4H_2O$ is used as the inhibitor, it is an embodiment that it is added to the amine absorbent in an amount of about 0.005 $kmol/m^3$ to about 0.30 $kmol/m^3$. In a further embodiment, the $KNaC_4H_4O_6.4H_2O$ is added in an amount of about 0.01 $kmol/m^3$.

In an embodiment, the inhibitor of amine degradation is ethylenediaminetetraacetic acid (EDTA). When EDTA is used as the inhibitor, it is an embodiment that it is added to the amine absorbent in an amount of about 0.00125 $kmol/m^3$ to about 0.1 $kmol/m^3$. In a further embodiment, EDTA is added in an amount of about 0.0025 $kmol/m^3$.

In another embodiment, the inhibitor of amine degradation is hydroxylamine ($NH_2OH$). When $NH_2OH$ is used as the inhibitor, it is an embodiment that it is added to the amine absorbent in an amount of about 0.025 $kmol/m^3$ to about 1.0 $kmol/m^3$. In a further embodiment, the $NH_2OH$ is added in an amount of about 0.025 $kmol/m^3$.

In another embodiment, the inhibitor of amine degradation is a mixture of one or more of $Na_2SO_3$, $KNaC_4H_4O_6.4H_2O$, EDTA and $NH_2OH$. In a further embodiment, the inhibitor of amine degradation is a mixture of $Na_2SO_3$ and $KNaC_4H_4O_6.4H_2O$. When a mixture of $Na_2SO_3$ and $KNaC_4H_4O_6.4H_2O$ is used as the inhibitor, it is an embodiment that it is added to the amine absorbent in an amount of about 0.055 $kmol/m^3$ to about 0.6 $kmol/m^3$, and in the molar ratio of $Na_2SO_3/KNaC_4H_4O_6.4H_2O$ of about 0.15 to about 60. In yet another embodiment the molar ratio of $Na_2SO_3/KNaC_4H_4O_6.4H_2O$ is about 1 to about 10, suitably about to about 8, more suitably about 3 to 5. In another embodiment of the disclosure the amount of $Na_2SO_3$ that is used, in particular in the inhibitor mixture of $Na_2SO_3$ plus $KNaC_4H_4O_6.4H_2O$ is about 0.01 $kmol/m^3$ to about 0.05 $kmol/m^3$.

The inhibitors of the present disclosure maintain their activity as inhibitors of amine degradation at the elevated temperatures observed in gas streams. In an embodiment of the present disclosure, the temperature of the gas stream is about 300 Kelvin to about 500 Kelvin. In another embodiment, is about 350 Kelvin to about 450 Kelvin. In a further embodiment, the temperature of the gas stream is about 393 Kelvin.

The inhibitors of the present disclosure inhibit oxygen ($O_2$) induced amine degradation at varying concentrations of $O_2$ present in the gas stream. In an embodiment, the inhibitors are able to inhibit oxygen ($O_2$) induced amine degradation when the gas stream contains from about 1% to about 100% of oxygen ($O_2$). In a further embodiment, the inhibitors are able to inhibit oxygen ($O_2$) induced amine degradation when the gas stream contains about 6% of oxygen ($O_2$).

The inhibitors of the present disclosure inhibit sulfur dioxide ($SO_2$) induced amine degradation at varying concentrations of $SO_2$ present in the gas stream. In an embodiment, the inhibitors are able to inhibit sulfur dioxide ($SO_2$) induced amine degradation when the gas stream contains from about 0 ppm to about 200 ppm of sulfur dioxide ($SO_2$). In a further embodiment, the inhibitors are able to inhibit sulfur dioxide ($SO_2$) induced amine degradation when the gas stream contains about 0-196 ppm sulfur dioxide ($SO_2$).

The gas stream of the present disclosure will generally be a combustion exhaust gas. In an embodiment, the combustion exhaust gas will be the gas stream expelled from power plants, refineries or cement manufacturers. As the gas streams are generally combustion exhaust gases, they will have varying levels of $CO_2$. In an embodiment, the gas stream of the present disclosure will have a $CO_2$ loading of about 1 to about 30%.

The present disclosure also relates to a method for removing $CO_2$ from a gas stream which comprises contacting the gas stream containing $CO_2$ with a liquid absorbent comprising an amine and an effective amount of an inhibitor of $O_2$- and $SO_2$-induced amine degradation, wherein the inhibitor is selected from $Na_2SO_3$, $KNaC_4H_4O_6.4H_2O$, EDTA and $NH_2OH$, and analogs and mixtures thereof.

The present disclosure also includes the use of an inhibitor to inhibit $O_2$- and $SO_2$-induced amine degradation during carbon dioxide $CO_2$ capture from gas streams. Accordingly, the present disclosure relates to the use of a compound selected from $Na_2SO_3$, $KNaC_4H_4O_6.4H_2O$, EDTA and $NH_2OH$, and analogs and mixtures thereof, to inhibit $O_2$- and $SO_2$-induced amine degradation during carbon dioxide $CO_2$ capture from gas streams.

The present disclosure also relates to a composition for capturing $CO_2$ from gas streams. The composition comprises an amine absorbent and an inhibitor of $O_2$- and $SO_2$-induced amine degradation, wherein the inhibitor is selected from sodium sulfite ($Na_2SO_3$), potassium sodium tartrate tetrahydrate ($KNaC_4H_4O_6.4H_2O$), ethylenediaminetetraacetic acid (EDTA) and hydroxylamine ($NH_2OH$), and analogs and mixtures thereof.

The terms "capture" and "capturing" as they apply to $CO_2$ in gas streams are used interchangeably herein. As used herein, these terms refer to processes that provide any measurable reduction in the levels of $CO_2$ in a gas stream for example by the sequestering or reaction of an absorbent with the $CO_2$ so that it is removed from the gas stream.

Solvents that are suitable for use in the method of the present disclosure include those that solubilize the amine absorbent and that act as an absorbent for $CO_2$. Examples of suitable solvents include water, alcohol and combinations thereof. In a particular embodiment of the present disclosure, the solvent is water, for example, deionized water. In another embodiment of the present disclosure, the solvent is an alcohol, for example methanol or ethanol.

When used to inhibit the $O_2$- and/or $SO_2$-induced amine degradation during $CO_2$ capture from a gas stream, the inhibitors of the present disclosure are mixed into the amine absorbent solution. In an embodiment, the amine is mixed with water, suitably deionized water, which results in an aqueous amine solution. The inhibitor is then also mixed into the amine solution to produce an aqueous amine solution that is spiked with the desired inhibitor. When a mixture inhibitors, for example a mixture of $Na_2SO_3$ and $KNaC_4H_4O_6.4H_2O$, is used as the inhibitor, the inhibitors can either be pre-mixed or can be independently added to the amine solution. Once the inhibitor spiked amine solution has been prepared with the desired concentrations of amine and inhibitor, the solution can be used to capture $CO_2$ from a gas stream.

The method of the present disclosure can be carried out in any conventional equipment for the removal of $CO_2$ from gas streams and the detailed procedures are well known to those skilled in the art. The method according to the present disclosure can be conveniently carried out in any suitable absorbers or absorption columns/towers, such as packed, plate or spray towers. Although certain specific conditions may favour one type of absorber over another, these absorbers are interchangeable to a considerable extent. In addition to the above indicated conventional absorbers, specialized absorption towers are also available to meet specific process requirements. These specialized absorption towers include impingement-plate scrubbers and turbulent contact scrubbers. The absorbers suitable for use with the method of the present disclosure may also contain other peripheral equipment which may enhance the method of the disclosure. Such peripheral equipment may include an inlet gas separator, a treated gas coalescor, a solvent flash tank, a particulate filter and a carbon bed purifier. Depending on the size of the equipment, the inlet gas flow rate will vary. The absorbers, strippers and peripheral equipment useful for carrying out the method of the present disclosure will be known to a person skilled in the art.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The following non-limiting examples are illustrative of the disclosure:

EXAMPLES

Experimental

Research grade gas mixtures containing 6% $O_2$ ($N_2$ balance) and $SO_2$ of varying concentration between 0-196 ppm, 100% $O_2$, and $CO_2$ were used. All of the gas mixtures were supplied by Praxair (Regina, Saskatchewan, Canada). $Na_2SO_3$ (98% purity), $KNaC_4H_4O_6 \cdot 4H_2O$ (99% purity), EDTA (99.4-100.06% purity), and $NH_2OH$ were all reagent grade and purchased from Sigma-Aldrich, Canada. A reagent grade concentrated MEA (>99% purity; Fisher Scientific, Nepean, Ontario, Canada) was used to prepare aqueous MEA solutions of desired concentrations by diluting their predetermined volumes with deionized water. The MEA concentrations were confirmed using volumetric titration technique with a standard solution of 1 kmol/m³ hydrochloric acid (HCl; Fisher Scientific, Nepean, Ontario, Canada). Methyl orange indicator was used to indicate the titration end point.

A batch-stainless steel reactor of 600 ml-volume size (model 5523, Parr Instrument Co., Moline, Ill.) was used to conduct degradation runs of the system of MEA-$O_2$—$SO_2$—$H_2O$ in the presence or absence of $CO_2$. The reactor mainly contained a cylindrical vessel and a removable head assembly. The reactor head was made up of a magnetic drive connected to a stainless steel (T316) stirring shaft with 2 impellers, a 0-300 psi Bourdon-type pressure reading gauge, gas inlet, gas purge and liquid sampling valves, a preset safety rupture disc rated at 6,895 kPa at 295 K, a J-type thermocouple, a dip tube for gas introduction and sample removal, and a cooling coil regulated by a solenoid valve. An electrical furnace regulated by a temperature-speed controller (Model 4836, Parr Instrument Co., Moline, Ill.) of +0.1% temperature accuracy supplied heat to the reactor. The temperature of the degradation mixture was set and monitored through the temperature-speed controller using a J-type thermocouple. As well, the stirrer speed was also controlled and displayed by the temperature-speed controller.

A high performance liquid chromatography technique with refractive index detector (HPLC-RID) was adopted for MEA determination.[13] The HPLC instrument (series 1100) was equipped with an on-line degasser, a quaternary pump, a thermostatted column compartment with ±0.5° C. temperature accuracy, and a refractive index detector (RID) (Agilent Technologies Canada, Mississauga, Ontario, Canada; model G1322A/G1311A/G1316A/G1362A). The chromatographic column was Nucleosil™ 100-5 SA containing a strong cationic exchanger of sulphonic acid (Macherey-Nagel, Germany) of 250 mm length×4.6 mm id. The system mobile phase was 0.05 kmol/m³ potassium dihydrogen phosphate solution ($KH_2PO_4$) adjusted to a pH of 2.6 by adding 85% w/w phosphoric acid ($H_3PO_4$). Liquid samples injection was achieved using an automatic liquid sampler (model G1313A) with the accuracy of 0.5% RSD of peak area for 5-100 µl injection range (Agilent Technologies Canada, Mississauga, Ontario, Canada). All chemicals were reagent grade and supplied by Sigma-Aldrich Canada, Mississauga, Ontario, Canada.

Example 1

Non-$CO_2$ Loaded Degradation

MEA-$H_2O$—$O_2$ with/without $SO_2$

For a typical run, the reactor vessel was filled with 450 ml of MEA solution spiked with the inhibitors of the desired concentration. The reactor head and the vessel were carefully assembled by tightening the 6 hex-bolts in a criss-cross manner to prevent leakage. The unit was placed in the furnace. The magnetic drive-stirrer was connected to the motor whereas the J-type thermocouple was hooked up to the temperature-speed controller. The solution was heated and stirred throughout the experiment at a constant speed of 500 rpm. Time was given to allow the temperature to reach and stabilize at the set point. At this stage, most pressure inside the reactor only resulted from water vapor pressure as determined by previous studies.[8,9,13] This led us to neglect MEA vapor pressure, thus allowing the degradation to be formulated as a homogeneous liquid phase process. Predetermined pressure of the $O_2/N_2$ or $O_2/N_2/SO_2$ gas mixture at 250 kPa was introduced into the solution through the gas inlet valve by regulating the appropriate gas tank. This resulted in a combination of water vapor pressure and 250 kPa of reactant gas as the reactor pressure. Due to the exothermic nature of the degradation, solenoid valve-regulated cooling water system was used to remove heat to preserve the isothermal condition of the system. This was also used in cases of unexpected temperature-overshoot. To also maintain the isobaric environment, the process pressure drop which was encountered due to the initial dissolution of $O_2$ or $O_2/SO_2$ in MEA solution was quickly replenished by boosting the pressure through the gas cylinder regulator. This step was also undertaken after each sampling process due to small pressure loss. A small amount of solution was discharged through the gas sampling valve to flush out old sample prior to each sampling in order to actually represent the MEA solution at that particular degradation time. Sampling was done by drawing about 2.5 ml sample into a 5 ml glass bottle. Any reaction and further MEA degradation in the sample was quenched by quickly bringing the bottle into contact with running water. The sample was subsequently analyzed for MEA concentration using the HPLC-RID technique.

Example 2

$CO_2$ Loaded Degradation

MEA-$H_2O$—$O_2$—$CO_2$ with/without $SO_2$

Once the MEA solution was placed in the vessel and the reactor head was put in place, regulated $CO_2$ pressure of 250 kPa was introduced into the MEA solution by opening its cylinder and gas inlet valve. The time needed to load $CO_2$ varied from 0.25 to 2 h depending on the desired dissolved $CO_2$ concentration in the MEA solution. By opening the liquid sampling valve, 4 ml of sample was taken and measured for $CO_2$ loading using the technique of HCl volumetric titration and $CO_2$ displacement in NaCl/$NaHCO_3$/methyl orange mixture. This was achieved by titrating a known volume of $CO_2$-loaded MEA sample with excess 1 kmol/$m^3$HCl to ensure complete release of $CO_2$ from MEA. The liberated $CO_2$ was collected and measured for its quantity in the displacement solution and was then expressed in terms of moles of $CO_2$ per one mole of MEA ($CO_2$ loading). The mixture was raised to the desired temperature and final $CO_2$ loading was once again determined. At this stage, the pressure of the reactor was a combination of non dissolved $CO_2$ pressure and water vapor pressure. $O_2/N_2$ or $O_2/N_2/SO_2$ regulated at 250 kPa was additionally introduced to the system resulting in the sum of $CO_2$ vapor pressure, water vapor pressure and 250 kPa $O_2/N_2$ or $O_2/N_2/SO_2$ pressure as the total reactor pressure. The rest of the procedure was then carried out by following those described for non $CO_2$ loaded experiments.

Example 3

HPLC Procedure

The HPLC procedure for determination of MEA concentration is detailed in the literature.[13] In brief, mobile phase containing 0.05 kmol/$m^3$ at pH 2.6 was degassed in an ultrasonic bath for 3 hours and filtered by a 0.20 µm nylon membrane filter to respectively remove dissolved $O_2$ and solid particles. Prior to injection, degraded sample was diluted with 1 in 40 ratio using nanopure water followed by filtration with 0.20 µm nylon membrane filter. Sample injection of 8 µl was done automatically by the automatic liquid sampler as described previously. The column was controlled isothermically at 303 K. Isocratic mode of 1 ml/min mobile phase was used throughout to achieve the analysis. RID used to detect MEA peak was also controlled at 303 K for its optical unit and operated in the positive mode.

Example 4

Determination of MEA Concentration

The calibration curve was constructed using MEA standard solutions prepared for various known concentrations ranging between 2-8 kmol/$m^3$. Each standard was analyzed three times by HPLC. The MEA peak areas were obtained and averaged. The averaged peak area of each standard was then plotted against its MEA concentration to obtain a calibration curve. To determine MEA concentration in degraded samples, a similar approach as for standard calibration was employed in which the degraded samples were analyzed for averaged MEA peak area with the HPLC. The peak area was then used to calculate for the exact MEA concentration with the aid of the calibration curve's equation.

Example 5

Inhibition of Amine Degradation Using Sodium Sulfite ($Na_2SO_3$) in the Presence of Oxygen ($O_2$)

The oxidative degradation of MEA in the absence of $SO_2$ was initially used to determine the inhibition effect of $Na_2SO_3$ and the optimum concentration required for minimizing the MEA degradation rate. Degradation runs were carried out using 5 kmol/$m^3$ MEA solution and 6% $O_2$ simulated flue gas stream. The degradation temperature chosen was 393 K in order to mimic the extreme condition in the stripper column.

As seen in FIG. 1, a concentration of 0.05 kmol/$m^3$ of $Na_2SO_3$ provided a significant inhibition of amine degradation. At this concentration, averaged degradation rate of MEA was measured at $4.10 \times 10^{-5}$ kmol/$m^3 \cdot$h which was approximately 11 times lower than that of the run carried out in the absence of $Na_2SO_3$ (e.g. $4.89 \times 10^{-4}$ kmol/$m^3 \cdot$h degradation rate). Equation (1) was used to calculate the percent inhibition of $Na_2SO_3$. The value obtained was 91%.

$$\% \text{ Inhibition} = \frac{|r_{w/o} - r_w|}{r_{w/o}} \times 100 \quad (1)$$

Where $r_{w/o}$ and $r_w$ are respective rate of MEA degradation without and with inhibitor (kmol/$m^3 \cdot$h).

A further experiment conducted using a higher $Na_2SO_3$ concentration of 0.1 kmol/$m^3$ yielded the opposite effect as seen in FIG. 1. MEA degradation rate was found to be $6.56 \times 10^{-4}$ kmol/$m^3 \cdot$h which was 1.3 times higher than that for the run without $Na_2SO_3$. A higher degradation rate of $1.28 \times 10^{-3}$ kmol/$m^3 \cdot$h was even observed when $Na_2SO_3$ concentration was increased to 0.3 kmol/$m^3$. The rate was 2.6 times as fast as that for the run conducted in the absence of $Na_2SO_3$ Example 6

Inhibition of Amine Degradation Using Sodium Sulfite ($Na_2SO_3$) in the Presence of Oxygen ($O_2$) and Sulfur Dioxide ($SO_2$)

As a concentration of 0.05 kmol/$m^3$ of $Na_2SO_3$ provided significant inhibition of the degradation of MEA by $O_2$, this concentration was selected for further evaluation using a more realistic system that also contained $SO_2$. Runs using 5 kmol/$m^3$ MEA, and simulated flue gas stream containing 6% $O_2$ and 6 and 196 ppm $SO_2$ conducted without $Na_2SO_3$ were initially carried out for comparison. Later, two additional runs both spiked with 0.05 kmol/$m^3$ $Na_2SO_3$ were respectively conducted with 6 and 196 ppm $SO_2$ in gas reactant. All experiments were carried out at 393 K.

Figure 2:
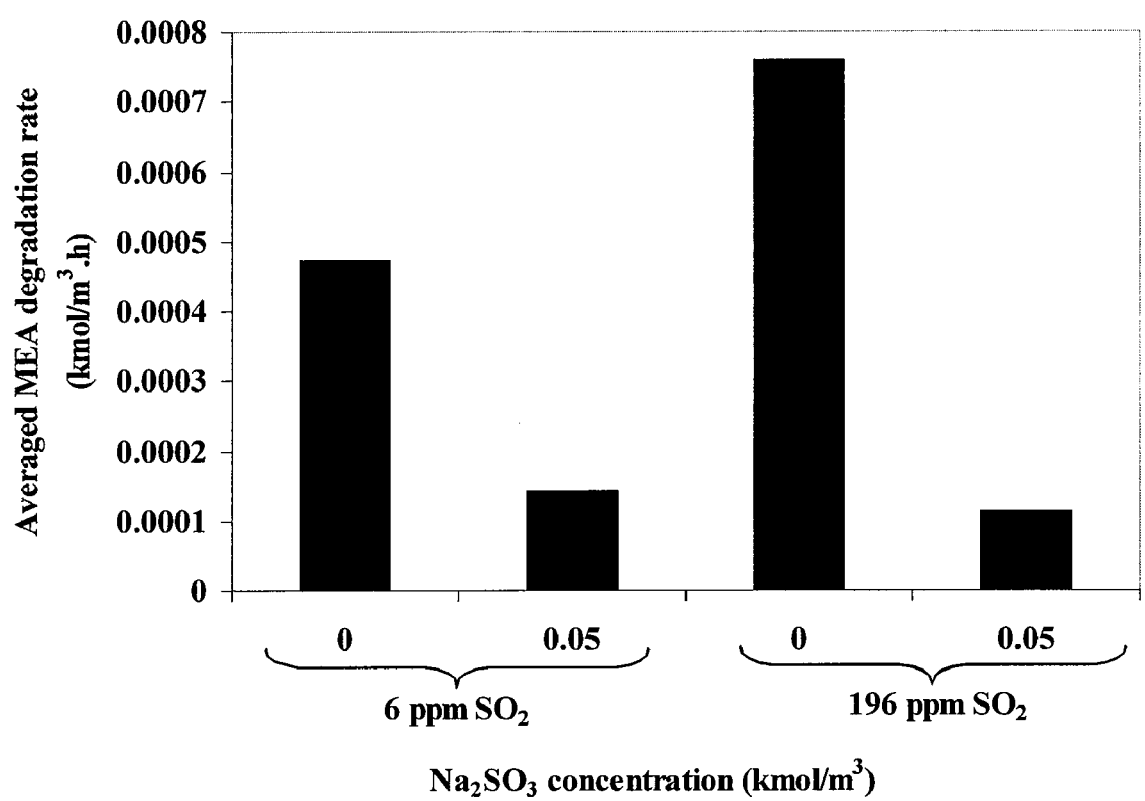
FIG. 2 shows the averaged MEA degradation rate at a concentration of 0.05 kmol/m$^3$ $Na_2SO_3$ and in the presence of 6% $O_2$, 6 ppm and 196 ppm $SO_2$.

The rates of degradation without $Na_2SO_3$ were respectively found for runs with 6 and 196 ppm as $4.74 \times 10^{-4}$ and $7.60 \times 10^{-4}$ kmol/m$^3$·h. For 6 ppm SO$_2$ system, the rate decreased drastically to $1.43 \times 10^{-4}$ kmol/m$^3$·h when Na$_2$SO$_3$ was present. The run containing 196 ppm SO$_2$ with the inhibitor also resulted in a lower degradation rate measured to be $1.14 \times 10^{-4}$ kmol/m$^3$·h. This indicates a strong inhibition effect of an effective concentration of Na$_2$SO$_3$ in minimizing the degradation of MEA by both O$_2$ and SO$_2$. FIG. 2 shows the averaged MEA degradation rate as a function of Na$_2$SO$_3$ concentration in the presence of 6 and 196 ppm SO$_2$ concentrations. Percent inhibitions of Na$_2$SO$_3$ in 6 and 196 ppm SO$_2$ systems calculated using Equation (1) were respectively found to be 70 and 85%.

Example 7

Inhibition of Amine Degradation Using Potassium Sodium Tartrate Tetrahydrate (KNaC$_4$H$_4$O$_6$.4H$_2$O) in the Presence of Oxygen (O$_2$) and Sulfur Dioxide (SO$_2$)

A similar approach as used for Na$_2$SO$_3$ was also used to identify concentrations of KNaC$_4$H$_4$O$_6$.4H$_2$O which would significantly reduce the degradation effect of MEA by O$_2$ and SO$_2$. A run conducted with 5 kmol/m$^3$ MEA, and a simulated gas stream containing 6% O$_2$ and 6 ppm SO$_2$, at 393 K as previously used in Na$_2$SO$_3$ experiments was also used as the base run to evaluate the concentration effect of KNaC$_4$H$_4$O$_6$.4H$_2$O in MEA-H$_2$O—O$_2$—SO$_2$ degradation system. The rate of O$_2$—SO$_2$ induced MEA degradation with 0.005 kmol/m$^3$ KNaC$_4$H$_4$O$_6$.4H$_2$O was found to be $5.71 \times 10^{-4}$ kmol/m$^3$·h. This was 1.2 times higher than that of the run without the compound. Runs were conducted with the concentrations of this compound at 0.01, 0.06, 0.1, and 0.3 kmol/m$^3$. The degradation rates of MEA were respectively found to be $2.58 \times 10^{-5}$, $1.02 \times 10^{-4}$, $8.04 \times 10^{-5}$, and $1.88 \times 10^{-4}$ kmol/m$^3$·h. These concentrations of KNaC$_4$H$_4$O$_6$.4H$_2$O could successfully reduce the degradation rate of MEA by 8, 5, 6, and 3 times, respectively. Averaged MEA degradation rates were used to compare the concentration effect of KNaC$_4$H$_4$O$_6$.4H$_2$O as given in FIG. 3. The percent inhibition calculated for the concentration of 0.01 kmol/m$^3$ KNaC$_4$H$_4$O$_6$.4H$_2$O was as high as 95%.

Figure 3:
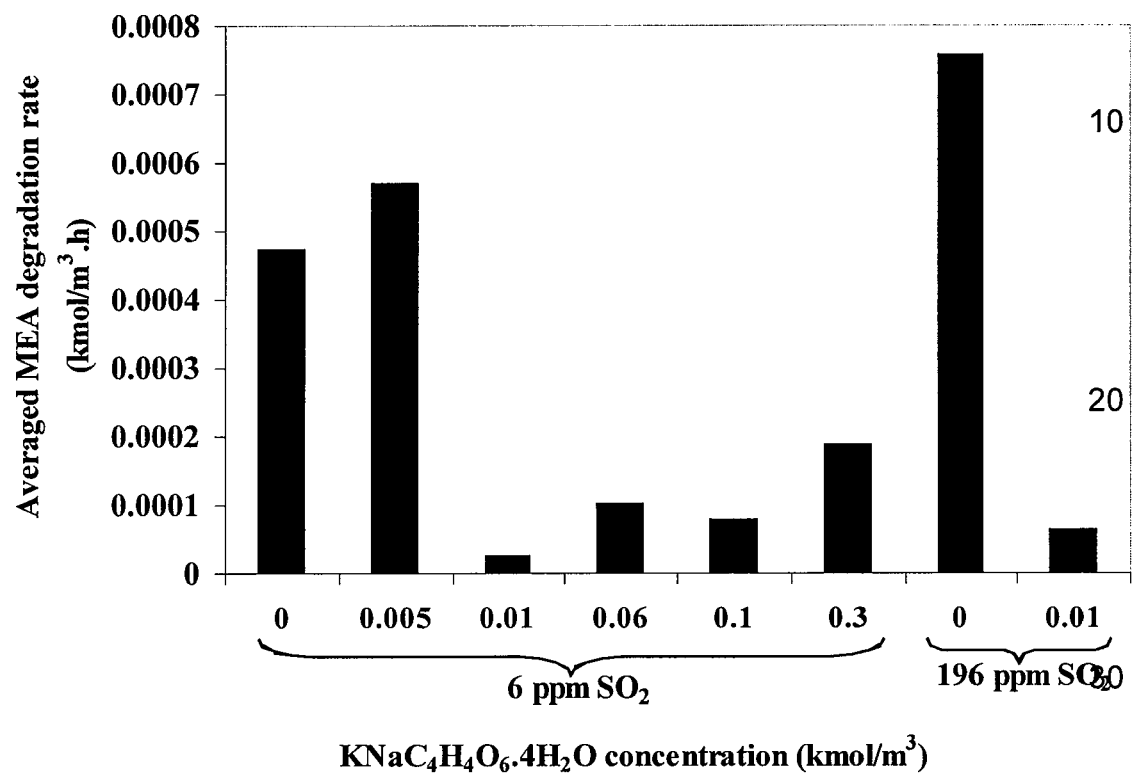
FIG. 3 shows the averaged MEA degradation rate at various concentrations of potassium sodium tartrate tetrahydrate ($KNaC_4H_4O_6 \cdot 4H_2O$) in the presence of 6% $O_2$, 6 ppm and 196 ppm $SO_2$.

The concentration of 0.01 kmol/m$^3$ KNaC$_4$H$_4$O$_6$.4H$_2$O also worked effectively when 196 ppm SO$_2$ was present in the simulated gas reactant. As also shown in FIG. 3, 91% inhibition was achieved when 0.01 kmol/m$^3$ KNaC$_4$H$_4$O$_6$.4H$_2$O was added to 5 kmol/m$^3$ MEA solution. The degradation rate by this inhibitor concentration was $6.48 \times 10^{-5}$ kmol/m$^3$ as compared to $7.60 \times 10^{-4}$ kmol/m$^3$ of run conducted without this inhibitor.

Example 8

Inhibition of Amine Degradation Using ethylenediaminetetraacetic acid (EDTA) in the Presence of Oxygen (O$_2$) and Sulfur Dioxide (SO$_2$)

Figure 4:
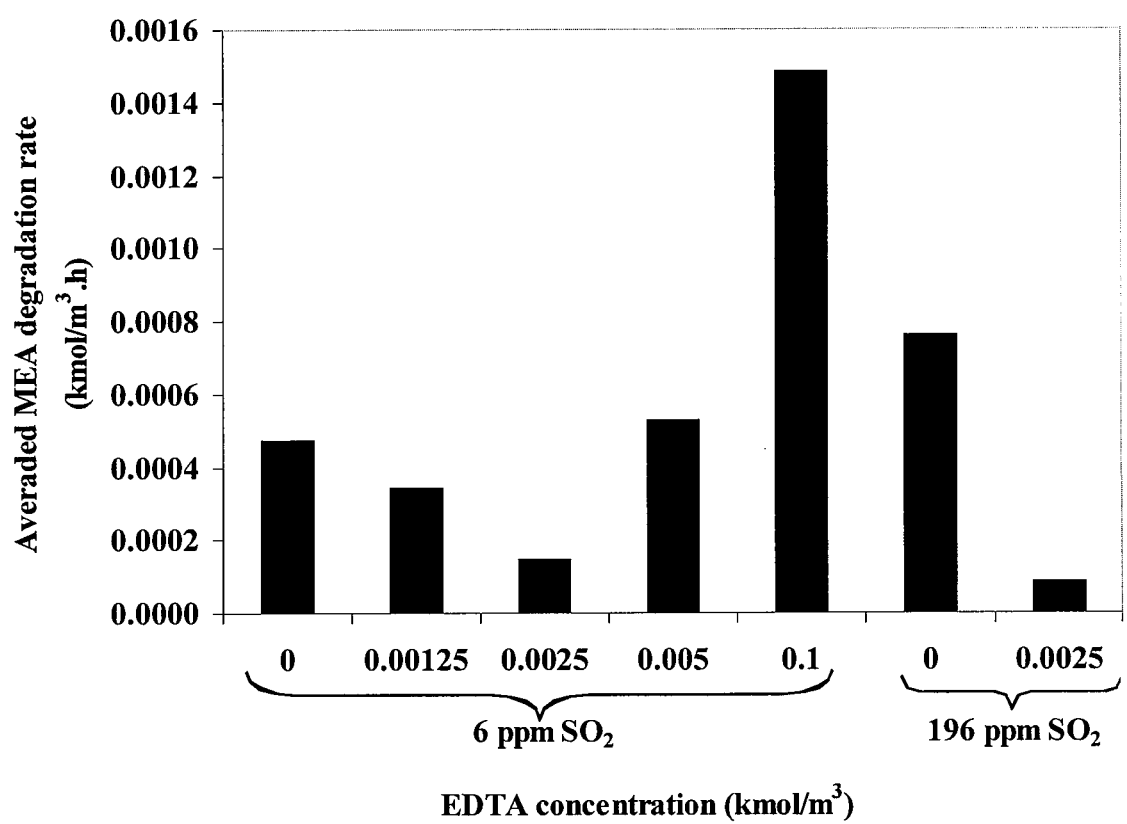
FIG. 4 shows the averaged MEA degradation rate at various concentrations of ethylenediaminetetraacetic acid (EDTA) in the presence of 6% $O_2$, 6 ppm and 196 ppm $SO_2$.

EDTA was initially evaluated using the degradation system of 5 kmol/m$^3$ MEA, 6% O$_2$, 6-ppm SO$_2$, and 393 K degradation temperature. EDTA concentrations used were varied between 0 and 0.1 kmol/m$^3$. EDTA concentration of 0.00125 kmol/m$^3$ was first added into the base run and found to decrease the degradation rate from $4.74 \times 10^{-4}$ to $3.41 \times 10^{-4}$ kmol/m$^3$. FIG. 4 representing averaged degradation rate versus inhibitor concentration bar chart also shows clearly that 28% inhibition could be obtained at this concentration.

A higher concentration of EDTA at 0.0025 kmol/m$^3$ was added aiming at further reducing the effect of MEA degradation by O$_2$ and SO$_2$. At this concentration, the degradation rate was reduced to $1.44 \times 10^{-4}$ which resulted in 69% inhibition. In addition, higher concentrations of EDTA at 0.005 and 0.1 kmol/m$^3$ were tested. A negative effect was however observed for both 0.005 and 0.1 kmol/m$^3$ systems for which cases the degradation rate increased respectively to $5.29 \times 10^{-4}$ and $1.48 \times 10^{-3}$ kmol/m$^3$·h.

The concentration of 0.0025 kmol/m$^3$ was also applied to 196 ppm SO$_2$ experiments. FIG. 4 also shows the corresponding averaged degradation rates vs. EDTA concentrations. In this system, the degradation rate was measured at $8.93 \times 10^{-5}$ kmol/m$^3$·h when EDTA was present. The rate was lower than $7.60 \times 10^{-4}$ kmol/m$^3$·h for the run conducted without the inhibitor. The percent inhibition of EDTA accounting for this rate reduction is 88%.

Example 9

Inhibition of Amine Degradation Using Hydroxylamine (NH$_2$OH) in the Presence of Oxygen (O$_2$) and Sulfur Dioxide (SO$_2$)

Figure 5:
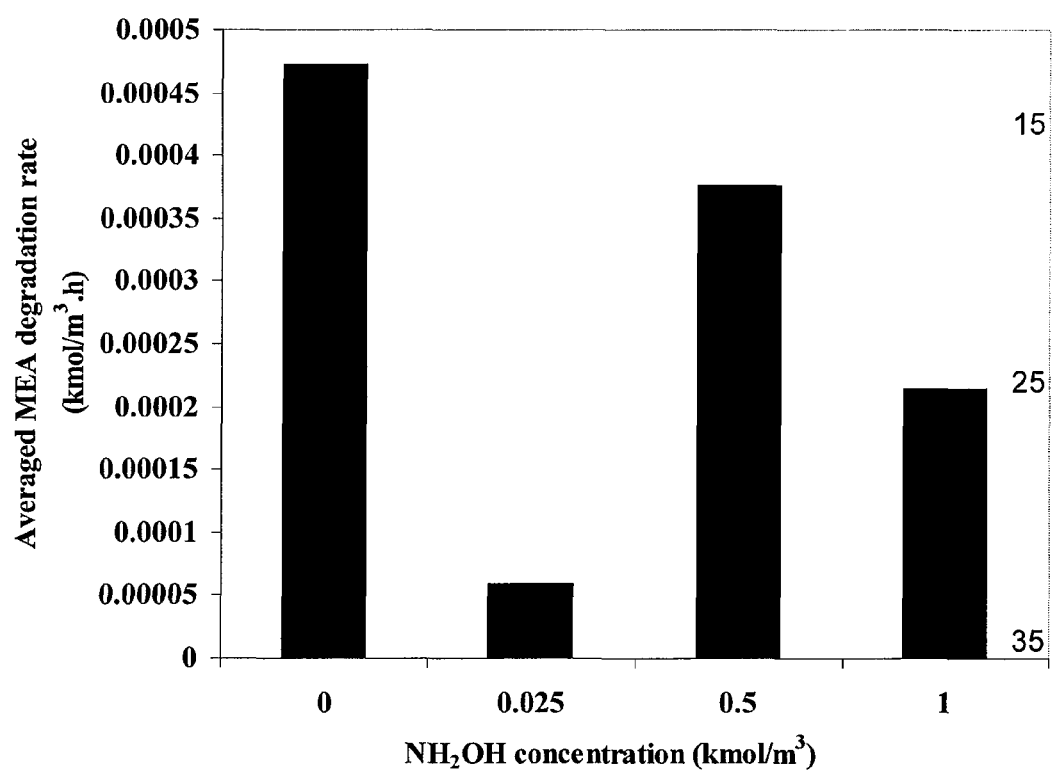
FIG. 5 shows the averaged MEA degradation rate at various hydroxylamine ($NH_2OH$) concentrations in the presence of 6% $O_2$ and 6 ppm $SO_2$.

The degradation system consisting of 5 kmol/m$^3$ MEA, 6% O$_2$, 6 ppm SO$_2$, and 393 K was also used for the determination of NH$_2$OH as an inhibitor. FIG. 5 illustrates the concentration effect of NH$_2$OH using averaged degradation rate of MEA. The addition of 0.025 kmol/m$^3$ NH$_2$OH into the MEA solution resulted in $5.96 \times 10^{-5}$ kmol/m$^3$·h averaged MEA degradation rate. At this concentration, the degradation rate was decreased by 87% when compared to the base run (without inhibitor). The use of higher concentrations of NH$_2$OH at 0.5 and 1 kmol/m$^3$ were also found to respectively reduce the degradation to $3.76 \times 10^{-4}$ and $2.14 \times 10^{-4}$ kmol/m$^3$·h. However, these concentrations were not as effective as 0.025 kmol/m$^3$ since they only resulted in 21 and 55% degradation inhibition. To conclude, the optimum concentration of NH$_2$OH found to be most effective in inhibiting O$_2$—SO$_2$ induced MEA degradation was 0.025 kmol/m$^3$.

Example 10

Inhibition of Amine Degradation Using Mixtures of Inhibitors in the Presence of Oxygen (O$_2$) and Sulfur Dioxide (SO$_2$)

Figure 6:
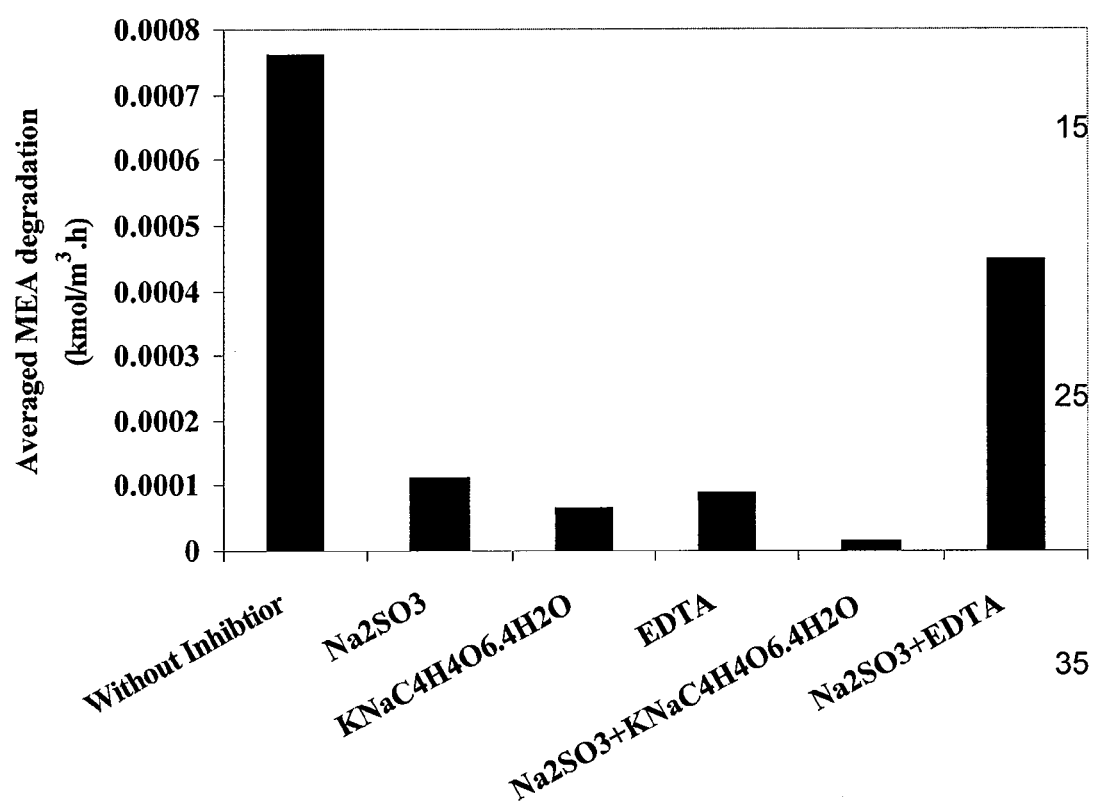
FIG. 6 shows the averaged MEA degradation rate in the presence of $Na_2SO_3$, $KNaC_4H_4O_6 \cdot 4H_2O$, EDTA, a mixture of $Na_2SO_3$ and $KNaC_4H_4O_6 \cdot 4H_2O$ and a mixture of $Na_2SO_3$ and EDTA in the presence of 6% $O_2$ and 196 ppm $SO_2$.

To test the mixed inhibitors, a more aggressive condition with 196 ppm SO$_2$ was used to conduct the degradation experiments while the rest of degradation parameters remained the same as used with the 6 ppm SO$_2$ runs. FIG. 6 summarizes the averaged MEA degradation rates of each blend combination. It is clear that the Na$_2$SO$_3$—KNaC$_4$H$_4$O$_6$.4H$_2$O blend (0.05 kmol/m$^3$ Na$_2$SO$_3$ and 0.01 kmol/m$^3$ KNaC$_4$H$_4$O$_6$.4H$_2$O) minimized MEA degradation by decreasing its rate from $7.60 \times 10^{-4}$ to $1.44 \times 10^{-5}$ kmol/m$^3$·h. This accounted for 98% degradation inhibition. The blend worked much more effectively than Na$_2$SO$_3$ or KNaC$_4$H$_4$O$_6$.4H$_2$O individually in which the percent inhibitions were respectively 85 and 91%. Although, the blend of Na$_2$SO$_3$-EDTA showed a reduction of the degradation rate by 41%, its effect was not as strong as when the individual compounds were used. Na$_2$SO$_3$ and EDTA as individual compounds both performed better than their blend respectively yielding higher percent inhibitions of 85 and 88%.

Example 11

Inhibition Effectiveness of $Na_2SO_3$, $KNaC_4H_4O_6\cdot4H_2O$, EDTA, $NH_2OH$, $C_6H_4(OH)_2$ or Mixtures Thereof with $CO_2$ Loading $CO_2$ will always be present in the amine solution either as lean amine or rich amine. Also, $CO_2$ on its own contributes towards the inhibition of amine degradation. This section demonstrates the inhibitive effect of $CO_2$ towards $O_2$—$SO_2$ induced amine degradation. It also demonstrates the inhibition effect of $CO_2$ in combination with either $Na_2SO_3$, $KNaC_4H_4O_6\cdot4H_2O$, EDTA, $NH_2OH$, $C_6H_4(OH)_2$, or mixtures thereof. Degradation experiments conducted with 100% $O_2$ were initially used to show the inhibition effect of $CO_2$ to the extreme case of $O_2$-induced MEA degradation. The run containing 0.22 $CO_2$ loading resulted in the degradation rate of $4.63\times10^{-3}$ kmol/m$^3$·h. The rate was reduced by a factor of 1.2 when $CO_2$ loading increased to 0.42. The rate even decreased further to $2.52\times10^{-3}$ kmol/m$^3$·h when 0.52 $CO_2$ was present in the system.

Figure 7:
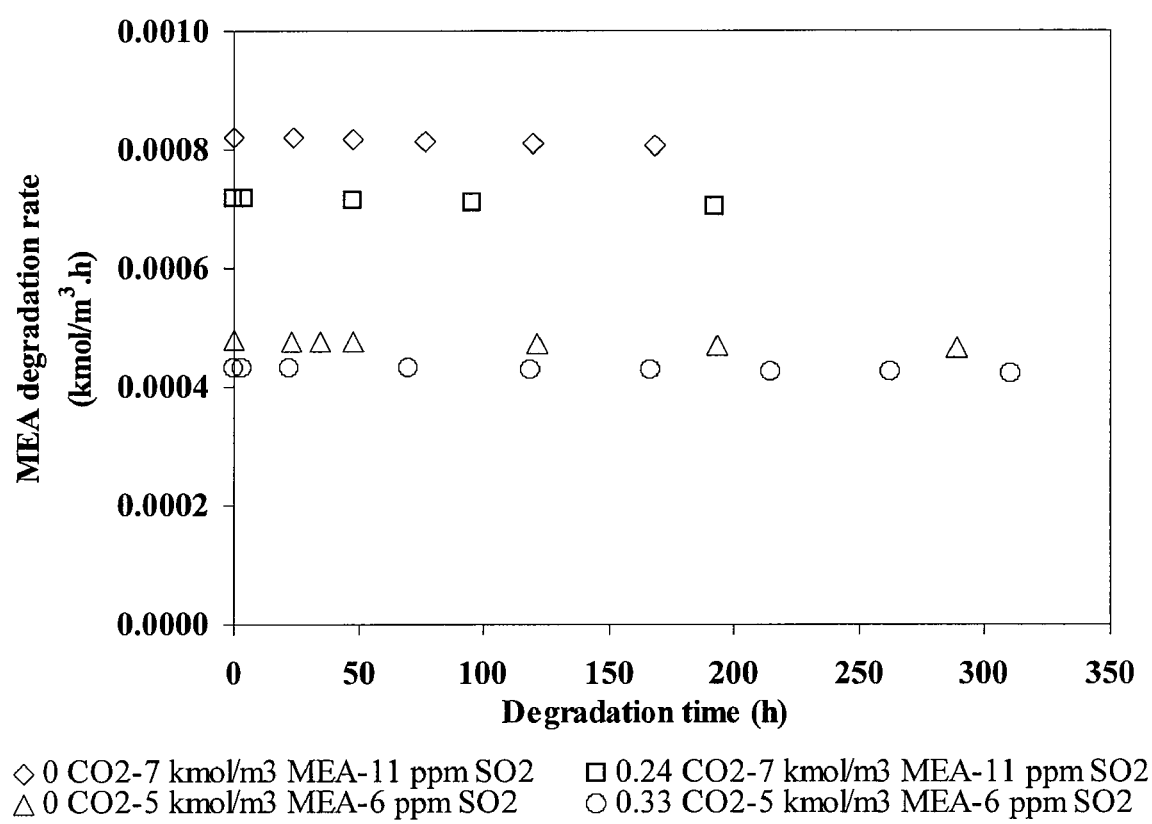
FIG. 7 shows the combined effect of $CO_2$ and $Na_2SO_3$/$KNaC_4H_4O_6 \cdot 4H_2O$/EDTA using MEA degradation rate-time plots (5 kmol/m$^3$, 6% $O_2$, 196 ppm $SO_2$, 0.33 $CO_2$ loading, 393 K)

The $CO_2$ loading effect was further evaluated with a more realistic case where 6% $O_2$ and 6 or 11 ppm $SO_2$ present in the simulated gas stream was used. FIG. 7 confirms the inhibition effect of $CO_2$ in the presence of $SO_2$. The run without $CO_2$ using 5 kmol/m$^3$ MEA, 6 ppm $SO_2$, and 393 K degradation temperature was first carried out. The degradation rate of MEA was found to be $4.74\times10^{-4}$ kmol/m$^3$·h. Addition of 0.33 $CO_2$ loading into the system resulted in a reduction of MEA degradation rate to $4.28\times10^{-4}$ kmol/m$^3$·h. The rate reduction by 0.33 $CO_2$ loading accounted for approximately 10% inhibition compared to 70-95% of $Na_2SO_3$/$KNaC_4H_4O_6\cdot4H_2O$/EDTA/$NH_2OH$. $CO_2$ loading of 0.24 was also tested using a different condition of 7 kmol/m$^3$ MEA, 11 ppm $SO_2$, and 393 K. At this loading, the averaged degradation rate was measured at $7.11\times10^{-4}$ kmol/m$^3$·h. Its comparable run conducted without $CO_2$ showed the degradation at the rate of $8.15\times10^{-4}$ kmol/m$^3$·h. Even with a more aggressive condition (e.g. higher concentrations of MEA and $SO_2$, $CO_2$ was still effective in slowing down the MEA degradation rate. The mechanism behind $CO_2$ effect has been previously discussed in the literature.[2] The existence of $CO_2$ which is more soluble in MEA solution than $O_2$ and $SO_2$ lowers the solubility of these degradation inducing species, thus reducing the MEA degradation rate. Although, percent inhibition of $CO_2$ (10%) was not as high as those of $Na_2SO_3$, $KNaC_4H_4O_6\cdot4H_2O$, EDTA and $NH_2OH$ (e.g. 70%, 95%, 50% and 87%). It can actually provide some protection to MEA from $O_2$—$SO_2$ induced degradation.

Figure 8:
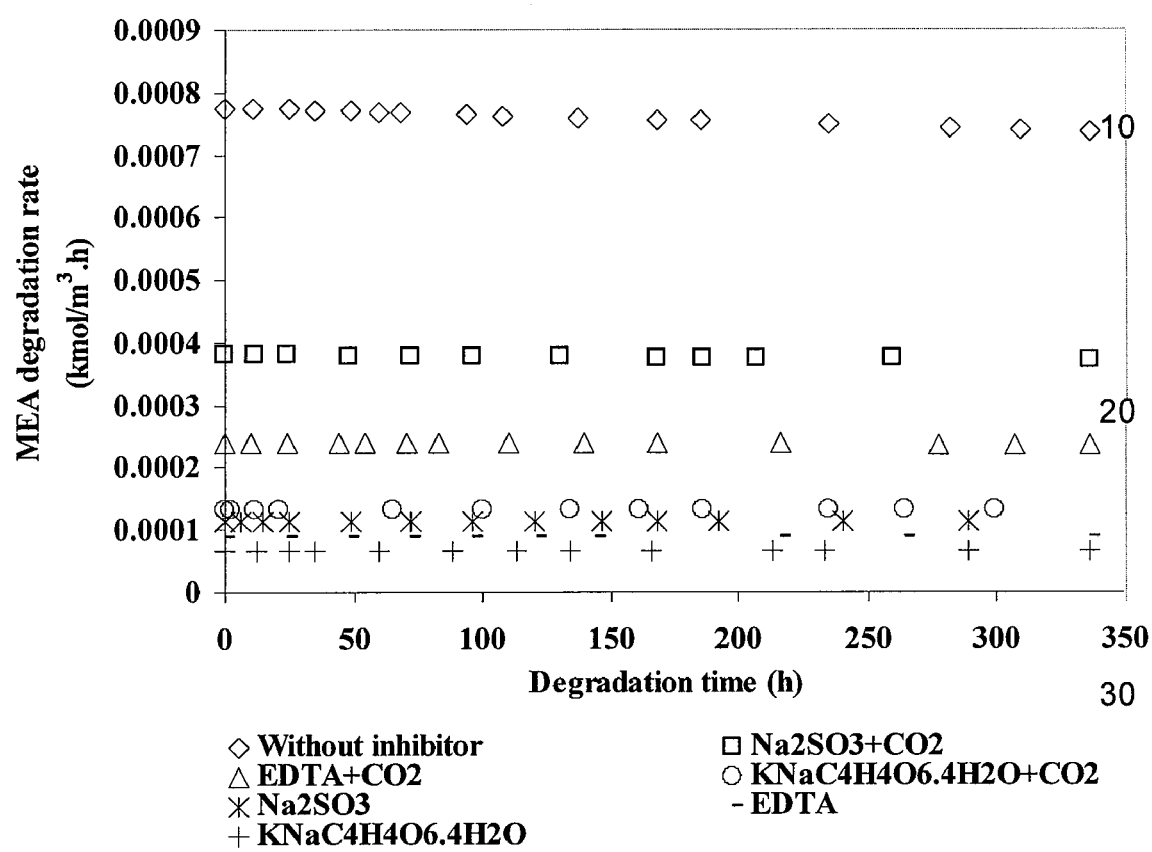
FIG. 8 shows the averaged MEA degradation rate of $Na_2SO_3+CO_2$, $KNaC_4H_4O_6 \cdot 4H_2O+CO_2$, and $EDTA+CO_2$ systems (5 kmol/m$^3$ MEA, 6% $O_2$, 196 ppm $SO_2$, 0.33 $CO_2$, loading, 393 K).

To better represent a more realistic case for $CO_2$ clean-up from power plant flue gases, the effect of the inhibitor compounds (e.g. $Na_2SO_3$, $KNaC_4H_4O_6\cdot4H_2O$, EDTA, and $NH_2OH$) in the presence of $CO_2$ was also studied. Prior to degradation experiments, MEA solution was preloaded with 0.33 mole $CO_2$/mole MEA and spiked with the previously determined optimum concentration of each inhibitor in which $Na_2SO_3$, $KNaC_4H_4O_6\cdot4H_2O$ and EDTA were initially selected for this test. The formulated solution was then subjected to the most aggressive degradation conditions in which 6% $O_2$-196 ppm $SO_2$ simulated flue gas stream and 393 K were used. FIG. 16 shows MEA degradation rate profiles for runs containing $Na_2SO_3$+$CO_2$, $KNaC_4H_4O_6\cdot4H_2O$+$CO_2$, and EDTA+$CO_2$. For comparison, the rate profiles for runs without any inhibitor, and with either $Na_2SO_3$, $KNaC_4H_4O_6\cdot4H_2O$, or EDTA are also given in the same figure. The corresponding averaged MEA degradation rates are shown in FIG. 8. It is clear that the systems containing $CO_2$ with either $Na_2SO_3$, $KNaC_4H_4O_6\cdot4H_2O$ or EDTA both showed lower degradation rates than those of corresponding runs without any inhibitors. Based on the averaged rates, combination of $Na_2SO_3$+$CO_2$, $KNaC_4H_4O_6\cdot4H_2O$+$CO_2$, and EDTA+$CO_2$ respectively reduced the MEA degradation rate of run without any inhibitors from $7.60\times10^{-4}$ kmol/m$^3$·h to $3.77\times10^{-4}$, $1.32\times10^{-4}$, and $2.39\times10^{-4}$ kmol/m$^3$·h. The percent inhibitor corresponding to these respective rates were 50, 83 and 69%. Thus, $CO_2$ combined with either $Na_2SO_3$, $KNaC_4H_4O_6\cdot4H_2O$ or EDTA successfully minimized MEA degradation.

Example 12

Figure 9:
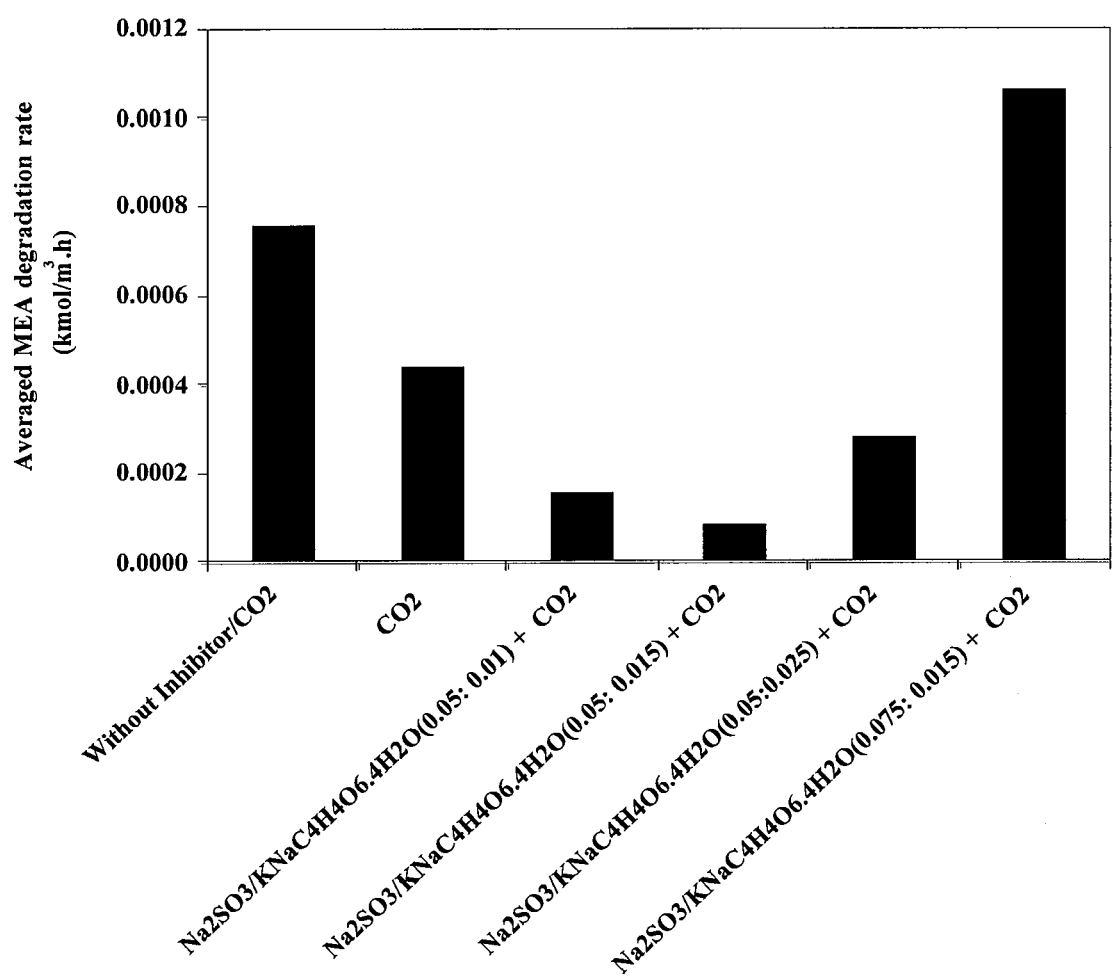
FIG. 9 shows the averaged MEA degradation rate without inhibitor or $CO_2$; in the presence of $CO_2$ alone; or in the presence of $Na_2SO_3KNaC_4H_4O_6 \cdot 4H_2O$ at $Na_2SO_3$ to $KNaC_4H_4O_6 \cdot 4H_2O$ ratios of 0.05:0.01, 0.05:0.015, 0.05:0.025, and 0.075:0.015 in the presence of 0.33 $CO_2$/mole MEA.

Inhibition Effectiveness of Mixtures of $Na_2SO_3$ and $KNaC_4H_4O_6\cdot4H_2O$ with $CO_2$ Loading The effectiveness of mixtures of $Na_2SO_3$ and $KNaC_4H_4O_6\cdot4H_2O$ with $CO_2$ loading was then examined. 5 kmol/m$^3$ MEA was initially spiked with $Na_2SO_3$ and $KNaC_4H_4O_6\cdot4H_2O$ having concentrations of 0.05 and 0.01 kmol/m$^3$ (5 to 1 ratio), respectively. The solution was later loaded with 0.33 $CO_2$/mole of MEA. It was subsequently degraded by a feed gas containing 196 ppm $SO_2$ and 6% $O_2$ at 393 K. As exemplified in FIG. 9, the averaged MEA degradation rate measured was found to be $1.57\times10^{-4}$ kmol/m$^3$·h. It was determined that MEA was degraded slower than that of a comparable run with only $CO_2$ present. The degradation rate of the run with $CO_2$ alone was found to be $4.40\times10^{-4}$ kmol/m$^3$·h. The degradation rate for the run without inhibitor or $CO_2$ was $7.60\times10^{-4}$ kmol/m$^3$·h is shown in FIG. 9, and used as a basis for calculation of inhibition performance. Based on this run, the percent inhibition of blended $Na_2SO_3$ and $KNaC_4H_4O_6\cdot4H_2O$ with 0.05 to 0.01 molar ratio was calculated as 79% whereas $CO_2$ alone only produced 42% inhibition effect.

It was further examined to determine if changing the molar ratio of $Na_2SO_3$ and $KNaC_4H_4O_6\cdot4H_2O$ would affect the inhibition performance of the mixture. $KNaC_4H_4O_6\cdot4H_2O$ was found to be a more effective inhibitor compared to $Na_2SO_3$ if used individually in non-$CO_2$ loaded-196 ppm $SO_2$ system. Therefore, it was decided to initially increase only the molar concentration of $KNaC_4H_4O_6\cdot4H_2O$ from 0.01 to 0.015 and to 0.025 kmol/m$^3$ while $Na_2SO_3$ concentration was kept at a concentration of 0.05 kmol/m$^3$. As seen in FIG. 9, changing the ratio of $Na_2SO_3$ and $KNaC_4H_4O_6\cdot4H_2O$ from 5:1 (0.05 to 0.01 molar ratio) to 3.3:1 (0.05 to 0.015 molar ratio) increased the inhibitive performance of the mixture. The MEA degradation rate was reduced to $8.24\times10^{-5}$ kmol/m$^3$·h resulting in 89% inhibition. On the other hand, an increase of $KNaC_4H_4O_6\cdot4H_2O$ to 0.025 kmol/m$^3$ (ratio 2:1 or 0.05 to 0.025 molar ratio) resulted in a reduction of the inhibition performance of the mixture to 63%.

An increase in molar concentration of $Na_2SO_3$ of the mixture was also examined. In this test, $Na_2SO_3$ concentration was increased from 0.05 to 0.075 kmol/m$^3$. This concentration was then mixed with 0.015 kmol/m$^3$ $KNaC_4H_4O_6\cdot4H_2O$ previously determined to be the optimum concentration of $KNaC_4H_4O_6\cdot4H_2O$ in the blend formulation. As also shown in FIG. 9, the blend of 0.075 kmol/m$^3$ $Na_2SO_3$ and 0.015 kmol/m$^3$ $KNaC_4H_4O_6\cdot4H_2O$ (5:1 ratio) resulted in an adverse effect whereby the degradation rate of MEA was accelerated. With this molar ratio, the degradation rate increased to $1.06\times10^{-3}$ kmol/m$^3$·h.

While the present disclosure has been described with reference to what are presently considered to be the preferred examples, it is to be understood that the disclosure is not limited to the disclosed examples. To the contrary, the disclosure is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

FULL CITATIONS FOR DOCUMENTS REFERRED TO IN THE SPECIFICATION

1) Idem, R.; Wilson, M.; Tontiwachwuthikul, P.; Chakma, A.; Veawab, A.; Aroonwilas, A.; Gelowitz, D. (2006). Pilot Plant Studies of the $CO_2$ Capture Performances of Aqueous MEA and Mixed MEA/MDEA Solvents at the University of Regina $CO_2$ Capture Technology Development Plant and the Boundary Dam $CO_2$ Capture Demonstration Plant. *Industrial & Engineering Chemistry Research*, 45(8), 2414-2420.
2) Rooney, P. C.; Dupart, M. S.; Bacon, T. R. (1998). Oxygen's Role in Alkanolamine Degradation. *Hydrocarbon Processing (International Edition)*, 77(7), 109-113.
3) McKnight, J. E. (1988). Air Exclusion Key to Gathering-System Upkeep. *Oil & Gas Journal*, February, 41-42.
4) Rooney, P. C.; Dupart, M. S. (2000). Corrosion in Alkanolamine Plants: Causes and Minimization. Paper presented at *Corrosion 2000: NACE International Annual Conference and Exposition*, Orlando, USA.
5) Veldman, R. R. (2000). Alkanolamine Solution Corrosion Mechanisms and Inhibition for Heat Stable Salts and $CO_2$. Paper presented at *Corrosion 2000: NACE International Annual Conference and Exposition*, Orlando, USA.
6) Howard, M; Sargent, A. (2001). Operating Experiences at Duke Energy Field Services Wilcox Plant with Oxygen Contamination and Amine Degradation. Paper presented at *The 51st Annual Laurance Reid Gas conditioning Conference*, Oklahoma University, Oklahoma, USA.
7) Chi, S.; Rochelle, G. T. (2002). Oxidative Degradation of Monoethanolamine. *Industrial & Engineering Chemistry Research*, 41(17), 4178-4186.
8) Bello, A.; Idem, R. O. (2005). Pathways for the Formation of Products of the Oxidative Degradation of $CO_2$-Loaded Concentrated Aqueous Monoethanolamine Solutions During $CO_2$ Absorption from Flue Gases. *Industrial & Engineering Chemistry Research*, 44(4), 945-969.
9) Lawal, A. O.; Bello, A.; Idem, R. O. (2005). The Role of Methyl Diethanolamine (MDEA) in Preventing the Oxidative Degradation of $CO_2$-Loaded and Concentrated Aqueous Monoethanolamine (MEA)-MDEA Blend During $CO_2$ Absorption from Flue Gases. *Industrial & Engineering Chemistry Research*, 44(6), 1874-1896.
10) Supap, T.; Idem, R.; Tontiwachwuthikul, P.; Saiwan, C. (2007). Kinetics of Sulfur Dioxide and Oxygen Induced Degradation of Aqueous Monoethanolamine Solution During $CO_2$ Absorption from Power Plant Flue Gas Streams. Paper Submitted for Publication with Industrial & Engineering Chemistry Research.
11) Uyanga, I. J.; Idem, R. O. (2007). Studies of $SO_2$- and $O_2$-Induced Degradation of Aqueous MEA during $CO_2$ Capture from Power Plant Flue Gas Streams. *Industrial & Engineering Chemistry Research*, 46(8), 2558-2566.
12) Goff, G. S.; Rochelle, G. T. (2006). Oxidation Inhibitors for Copper and Iron Catalyzed Degradation of Monoethanolamine in $CO_2$ Capture Processes. *Industrial & Engineering Chemistry Research*, 45(8), 2513-2521.
13) Supap, T.; Idem, R.; Tontiwachwuthikul, P.; Saiwan, C. (2006). Analysis of Monoethanolamine and Its Oxidative Degradation Products During $CO_2$ Absorption from Flue Gases: a Comprehensive Study of GC-MS, HPLC-RID, and CE-DAD Analytical Techniques and Possible Optimum Combinations. *Industrial & Engineering Chemistry Research*, 45(8), 2437-2451.

We claim:

1. A method for inhibiting $O_2$- and/or $SO_2$-induced amine degradation during $CO_2$ capture from a gas stream comprising adding to an amine absorbent, an effective amount of an inhibitor of $O_2$- and/or $SO_2$-induced amine degradation selected from sodium sulfite ($Na_2SO_3$), potassium sodium tartrate tetrahydrate ($KNaC_4H_4O_6 \cdot 4H_2O$), ethylenediaminetetraacetic acid (EDTA) and hydroxylamine ($NH_2OH$), and analogs and mixtures thereof, wherein a mixture of $Na_2SO_3$ and $KNaC_4H_4O_6 \cdot 4H_2O$ is added in an amount of about 0.055 kmol/m$^3$ to about 0.6 kmol/m$^3$, and in the molar ratio of $Na_2SO_3/KNaC_4H_4O_6 \cdot 4H_2O$ of about 0.15 to 60.

2. The method according to claim 1, wherein the $Na_2SO_3$ is added in an amount of about 0.05 kmol/m$^3$ to about 0.3 kmol/m$^3$.

3. The method according to claim 1, wherein the $KNaC_4H_4O_6 \cdot 4H_2O$ is added in an amount of about 0.005 kmol/m$^3$ to about 0.30 kmol/m$^3$.

4. The method according to claim 3, wherein the $KNaC_4H_4O_6 \cdot 4H_2O$ is added in an amount of about 0.01 kmol/m$^3$.

5. The method according to claim 1, wherein the EDTA is added in an amount of about 0.00125 kmol/m$^3$ to about 0.1 kmol/m$^3$.

6. The method according to claim 5, wherein the acid EDTA is added in an amount of about 0.0025 kmol/m$^3$.

7. The method according to claim 1, wherein $NH_2OH$ is added in an amount of about 0.025 kmol/m$^3$ to about 1.0 kmol/m$^3$.

8. The method according to claim 7, wherein $NH_2OH$ is added in an amount of about 0.025 kmol/m$^3$.

9. The method according to claim 1, where the mixture of sodium sulfite ($Na_2SO_3$) and potassium sodium tartrate tetrahydrate ($KNaC_4H_4O_6 \cdot 4H_2O$) is added in amounts of about 0.05 kmol/m$^3$ $Na_2SO_3$ and 0.01 kmol/m$^3$ $KNaC_4H_4O_6 \cdot 4H_2O$.

10. A method for inhibiting $O_2$- and/or $SO_2$-induced amine degradation during $CO_2$ capture from a gas stream comprising adding to an amine absorbent, an effective amount of an inhibitor of $O_2$- and/or $SO_2$-induced amine degradation selected from sodium sulfite ($Na_2SO_3$), potassium sodium tartrate tetrahydrate ($KNaC_4H_4O_6 \cdot 4H_2O$), ethylenediaminetetraacetic acid EDTA and hydroxylamine ($NH_2OH$), and analogs and mixtures thereof, wherein a mixture of $Na_2SO_3$ and $KNaC_4H_4O_6 \cdot 4H_2O$ is used as the inhibitor in a molar ratio of $Na_2SO_3/KNaC_4H_4O_6 \cdot 4H_2O$ of about 5.

11. The method according to claim 10, wherein a mixture of $Na_2SO_3$ and $KNaC_4H_4O_6 \cdot 4H_2O$ is used as the inhibitor in a molar ratio of $Na_2SO_3/KNaC_4H_4O_6 \cdot 4H_2O$ of about 3.

12. The method according to claim 1, where the amine absorbent comprises monoethanolamine (MEA), diethanolamine (DEA), methyldiethanolamine (MDEA), MEA-MDEA mixtures or DEA-MDEA mixtures.

13. The method according to claim 12, wherein the amine is monoethanolamine.

14. The method according to claim 1, wherein the amine is present in an amount of about 2.5 kmol/m$^3$ to about 7.5 kmol/m$^3$.

15. The method according to claim 14, wherein the amine is present in an amount of about 5.0 kmol/m$^3$.

16. The method according to claim 1, wherein the temperature of the gas stream is about 300 Kelvin to about 500 Kelvin.

17. The method according to claim 16, wherein the temperature of the gas stream is about 350 Kelvin to about 450 Kelvin.

18. The method according to claim 17, wherein the temperature of the gas stream is about 393 Kelvin.

19. The method according to claim 1, wherein the gas stream contains about 1% to about 100% of oxygen ($O_2$).

20. The method according to claim 19, wherein the gas stream contains about 6% of $O_2$.

21. The method according to claim 1, wherein the gas stream contains sulfur dioxide ($SO_2$) in an amount of about 0 to about 196 ppm.

22. The method according to claim 1, wherein the gas stream contains carbon dioxide ($CO_2$) in an amount of about 1% to 30%.

23. The method according to claim 1, wherein the amine absorbent has a carbon dioxide ($CO_2$) loading of about 0.05 mol $CO_2$/mol of amine to about 2.0 mol $CO_2$/mol of amine.

24. The method according to claim 1, wherein the gas stream comprises combustion exhaust gas.

25. The method according to claim 24, wherein the combustion exhaust gas comprises gas streams from power plants, refineries or cement manufacturers.

26. A method for removing $CO_2$ from a gas stream comprising contacting the gas stream with a liquid absorbent comprising an amine and an effective amount of an inhibitor of $O_2$- and/or $SO_2$-induced amine degradation, wherein the inhibitor is selected from sodium sulfite ($Na_2SO_3$), potassium sodium tartrate tetrahydrate ($KNaC_4H_4O_6 \cdot 4H_2O$), ethylenediaminetetraacetic acid (EDTA) and hydroxylamine ($NH_2OH$) and mixtures thereof, wherein a mixture of $Na_2SO_3$ and $KNaC_4H_4O_6 \cdot 4H_2O$ is added in an amount of about 0.055 kmol/m$^3$ to about 0.6 kmol/m$^3$, and in the molar ratio of $Na_2SO_3/KNaC_4H_4O_6 \cdot 4H_2O$ of about 0.15 to 60.

27. A composition for capturing $CO_2$ from gas streams comprising an amine and an inhibitor of $O_2$ and/or $SO_2$-induced amine degradation, wherein the inhibitor is selected from sodium sulfite ($Na_2SO_3$), potassium sodium tartrate tetrahydrate ($KNaC_4H_4O_6 \cdot 4H_2O$), ethylenediaminetetraacetic acid (EDTA) and hydroxylamine ($NH_2OH$), and analogs and mixtures thereof, wherein said inhibitor comprises a mixture of $Na_2SO_3$ and $KNaC_4H_4O_6 \cdot 4H_2O$ in an amount of about 0.055 kmol/m$^3$ to about 0.6 kmol/m$^3$, and in the molar ratio of $Na_2SO_3/KNaC_4H_4O_6 \cdot 4H_2O$ of about 0.15 to 60.

* * * * *